June 2, 1931.  N. M. BAKER  1,807,681
GOGGLES
Filed Oct. 18, 1927   2 Sheets-Sheet 1
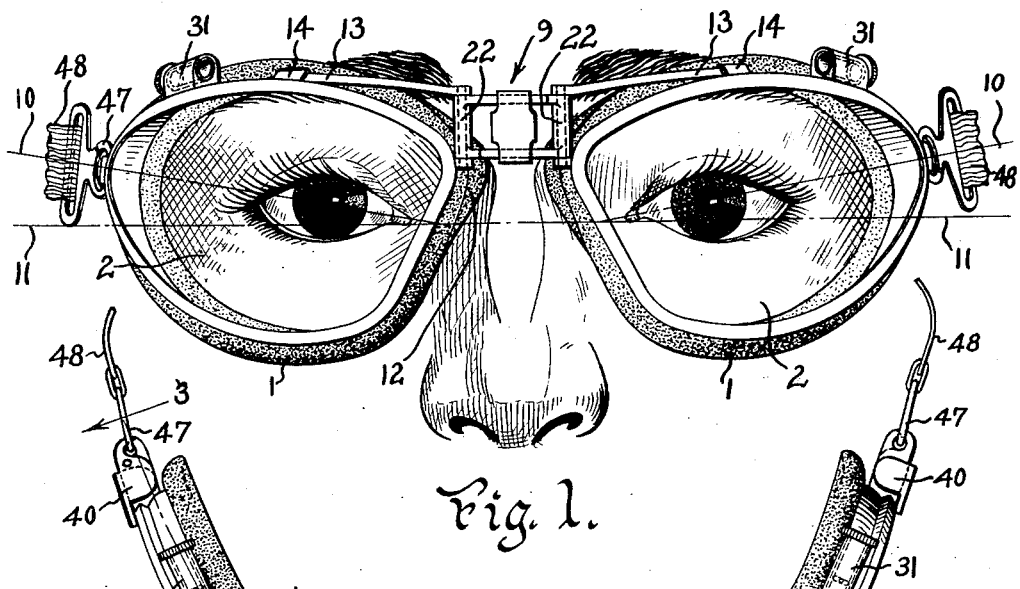
Fig. 1.
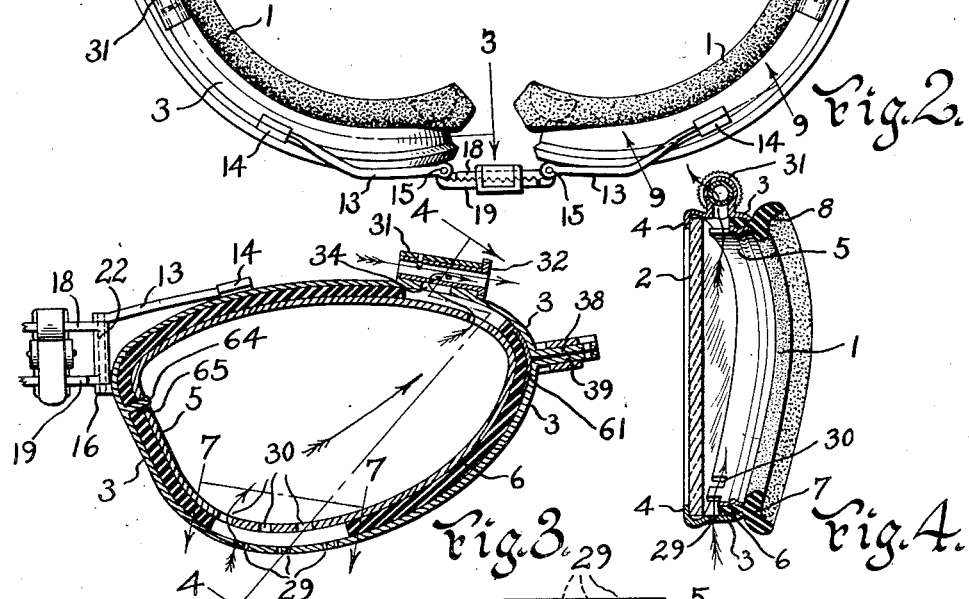
Fig. 2.
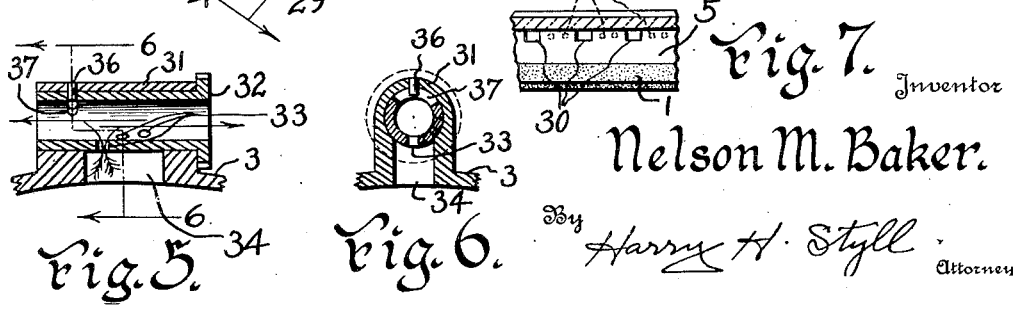
Fig. 3.  Fig. 4.
Fig. 5.  Fig. 6.  Fig. 7.
Inventor
Nelson M. Baker.
By Harry H. Styll
Attorney June 2, 1931.  N. M. BAKER  1,807,681
GOGGLES
Filed Oct. 18, 1927   2 Sheets-Sheet 2
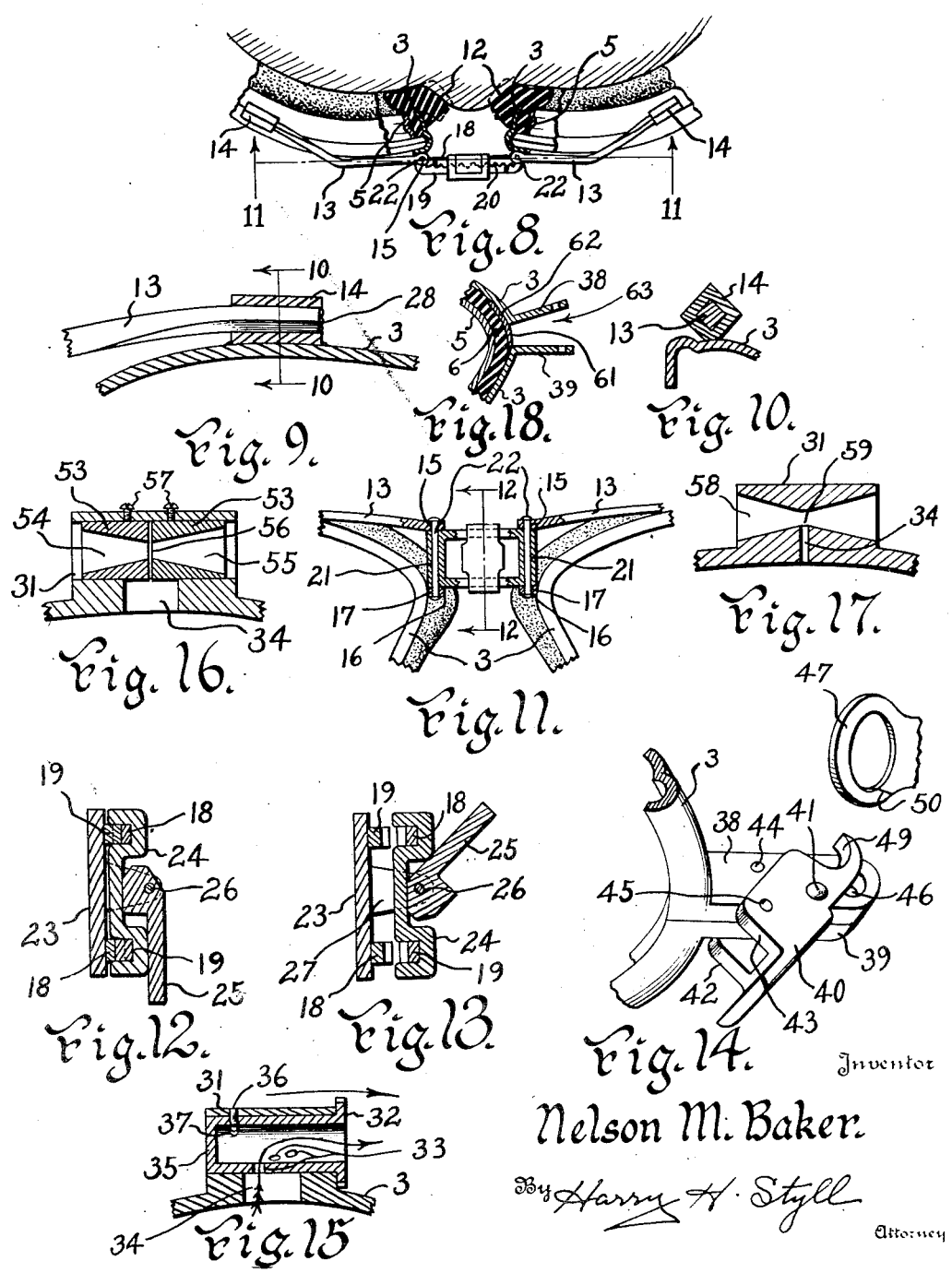

Patented June 2, 1931

1,807,681

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLES

Application filed October 18, 1927. Serial No. 226,900.

This invention relates to eye protectors or goggles and has particular reference to a goggle adapted for the use of aviators.

The principal object of the invention is to provide an eye protector or goggle for aviators combining wide range of vision with a tight and comfortable fit on the facial contacting parts of the construction.

Another object of the invention is to provide improved means of ventilation for a device of this character.

Another object of the invention is to provide improved means for connecting the eye cups of such a device.

Another object of the invention is to provide improved means for fitting the eye cups to the facial contour of the wearer, particularly providing means for a snug and comfortable fit into the nasal socket of the wearer.

Another object of the invention is to provide improved means for inserting and removing the lenses.

Another object of the invention is to provide an improved means for fitting such a device to the face of the wearer whereby the air or wind from the outside will not enter the eye cup except as provided for ventilation.

Another object of the invention is to provide improved means for holding the lenses accurately in alignment with the eyes of the wearer so that they may be compactly folded when not in use.

Another object of the invention is to provide means for accurately positioning the facial contacting parts of the goggle in the eye cups.

Another object of the invention is to provide means whereby the facial contacting parts of the goggle may be quickly and easily inserted in or positioned in the eye cups of the goggle whereby said parts and the lens rims may be aligned.

Other objects and advantages of the invention will become apparent from the following description taken in connection with the accompanying drawings and it will be apparent that many changes may be made in the arrangements of the parts and details of construction without departing from the spirit of the invention as set forth in the accompanying claims. I, therefore, do not wish to be limited to the exact details and arrangements shown as the preferred forms only of my invention have been shown by way of illustration.

Referring to the drawings:

Fig. 1 is a front view of the device in place on the face of the wearer;

Fig. 2 is a top view of Fig. 1;

Fig. 3 is a cross section on line 3—3 of Fig. 2;

Fig. 4 is a cross section on line 4—4 of Fig. 3;

Fig. 5 is an enlarged sectional view of the ventilation opening shown in Fig. 3;

Fig. 6 is a cross section on line 6—6 of Fig. 5;

Fig. 7 is a partial cross section on line 7—7 of Fig. 3;

Fig. 8 is a fragmentary plan view shown partially in section taken at the bridge connection and showing the arrangement of the face contacting portion in the vicinity of the nasal socket of the wearer;

Fig. 9 is a fragmentary cross section on line 9—9 of Fig. 2 showing the connection of the bridge bar;

Fig. 10 is a cross section on line 10—10 of Fig. 9;

Fig. 11 is a cross section on line 11—11 of Fig. 8;

Fig. 12 is a cross section on line 12—12 of Fig. 11;

Fig. 13 is a view similar to Fig. 12 showing the parts separated one from the other with the clamp member in open position;

Fig. 14 is an enlarged perspective showing the end piece connection of the lens frames and the connection for the head band;

Fig. 15 is a view similar to Fig. 5 showing one end of the air chamber closed.

Fig. 16 is an enlarged sectional view showing a further modification of the ventilating opening.

Fig. 17 is a view similar to Fig. 16 showing a further modification.

Fig. 18 is a fragmentary sectional view of the end-piece in opened position showing the guiding tongue or shield.

The improved goggle comprises a pair of eye cups 1 carrying lenses 2. The eye cup 1 comprises an outer rim or ring 3 having a flanged lens seat 4 and an inner ring or rim 5 between which is held the flange 6 of the resilient face contacting member 7. The face contacting ring 7 has the enlarged portion 8 for engagement with the face and this ring is made preferably of soft rubber. The eye cups 1 are secured one to the other by the bridge 9. It will be noted that the eye cups 1 are placed at an angle instead of horizontally, that is, the greatest length of the eye cup 1 is along the line 10 instead of along the horizontal line 11, the angle between the lines 10 and 11 in this particular instance being about ten degrees. The lens 2 is placed in the eye cup so that its longitudinal axis is along the line 11 whereby the axis of the lens is held horizontal when on the face of the wearer. It has been found that when the eye cups are placed in this angular position they fit the contour of the face much better, providing a tight, snug and comfortable fit and also increase the angle of vision on the outer side of the eye cup because as the eye is moved outwardly it is usually cocked upwardly at the same time. This angular arrangement also provides a better attachment for the head band which may be attached on the central line of the eye cup in such a position that the head band will go over the ear.

In Figs. 1 and 8 it will be noted that on the nasal side of the eye cup there is a projection 12 of the resilient ring 7 fitting into the nasal socket. It has been found from experience that ordinarily goggles of this type do not fit snugly into the nasal socket or canthus, hence an open space is left which allows the wind to be driven in through the opening into the eye cup. This defect is overcome by enlarging the enlarged portion 8 to fit into the nasal canthus, as has been described. This is an important feature of the present invention. It will be understood that these projections 12 being of soft rubber are very resilient and fit themselves naturally and easily to noses of various sizes and to contours of the nasal canthus of various shapes. In Fig. 8 it will be seen that the projection 12 has been rolled out over the rim 3 which forms a backing support for the projecting portion when it is compressed by contact with the nose.

The bridge connection 9 comprises a pair of bridge bars 13 having one end fitting into a lug 14 on the frame or rim 3. These bridge bars 13 have an opening 15 on their other ends for a pivotal connection. Lugs 16 are secured to each of the rims 3 and provided with a pivotal opening 17, see Fig. 11. A pair of interlocking arms 18 and 19 having serrated engaging surfaces 20 are provided with the pivot openings 21, one pivot opening at the end of each pair of arms. These pivot openings are aligned with the pivot openings 15 and 17 and the arms are held in place by means of the pivot pin 22. The interlocking arms 18 and 19 are held between a pair of clamping plates 23 and 24, see Fig. 12 and Fig. 13. The clamping plate 24 is engaged by a pivoted cam lever 25 pivoted at 26 to the lug 27 on the clamp plate 23. It will be seen that by the operation of the cam lever 25 the interlocking arms 18 and 19 may be locked in engaging position or may be separated to adjust the distance between the eye cups. When the interlocking arms 18 and 19 are set at the position giving the required distance between the eye cups they may be locked in this position by throwing down the cam lever 25, forcing the clamp plates 23 and 24 together to lock the arms 18 and 19 as shown in Fig. 12.

It will be seen from the foregoing that not only the distance between the eye cups may be regulated by the serrated arms 18 and 19, but the eye cups may be angled with respect to each other on the pivots 22 so that when the goggle is not in use the cups may be folded one on the other on the pivots 22. This provides means for folding the eye cups with respect one to the other and for adjusting the distance between them.

It will be noted from Figs. 9 and 10 that the end of the bridge bar 13 is held in the lug 14. The reason this construction is provided is that if the bridge bar 13 were soldered directly to the frame 3 the heat would soften the bridge bar 13 and spoil its temper. Therefore, in order to avoid this disadvantage the bridge bar 13 is slipped into the lug 14 and the ends of the lug 14 and the bridge bar 13 are soldered together at 28. This provides a simple and efficient means for securing the bridge bar 13 to the rim 3 without destroying the temper or rigidity of the material during the soldering operation.

The eye cups are ventilated through the openings 29 in the rim 3 and 30 in the rim 5 on one side of the eye cup and by the tubular lug 31 having a tubular sleeve 32 with a plurality of openings 33 aligning with the opening 34 in the rim 3, see Fig. 5. The sleeve 32 in Fig. 5 is open at both ends. In Fig. 15 the sleeve is closed at one end as shown at 35. The tubular lug 31 is fitted with the pin 36 which fits into an elongated slot 37 in the sleeve 32. By rotating the sleeve 32 in the lug 31 either one or more of the openings 33 may be thrown into line with the opening 34 in the rim 3 and in this way the amount of ventilation may be regulated. The pin 36 holds the sleeve 32 in the extreme open and closed positions and against removal therefrom. The construction and operation are best shown in Figs. 5 and 6. A suction is caused by the air rushing through the tube of the lug 31. This drives the air in through the openings 29 and 30 in the rims 3 and 5. In Fig. 15 the air instead of rushing through the tubular lug 31 rushes over the top and past the orifice of the member 32.

Fig. 16 shows a modification in which two adjustable sleeve members 53 having the oppositely tapered bores 54 and 55 are positioned in the tubular lug 31, the smaller cross sections being adjacent. The sleeve members 53 are slightly spaced at 56 to form an opening aligned with the opening 34 so that the eye cups of the goggle may be ventilated through the sucking action of the vent sleeves 55 when air rushes through the sleeves from either side. These sleeves are adjustable longitudinally of the tubular lug 31 to vary the size of the opening 56 and are held in adjusted position by the set screws or the like 57.

Fig. 17 shows a further modification similar to Fig. 16 only in this instance the tubular lug 31 is formed with the oppositely tapered bore 58, the smaller cross section of which is intermediate its ends and has the opening 34 aligned with the smaller section or neck 59 of the bore 58 so that the eye cups of the goggle may be ventilated in a similar manner as in the construction shown in Fig. 16 when air rushes through the tube from either side. In this instance the vent opening 34 is of a definite predetermined size and in a fixed position with respect to the oppositely tapered bore 58 and is not adjustable as in the previously described construction.

In Fig. 3 it will be noted that the rim 3 is split and has the end pieces 38 and 39 which are held together by the clamp 40 pivoted at 41, see Fig. 14. The clamp 40 has the engaging ears 42 and 43.

In Fig. 14, 44 is a locking pin in the member 38, and 45 is a recess opening in the clamp member 40 so that when the clamp member 40 is rotated on its pivot to close the end pieces 38 and 39 the projection 44 interlocks with the recess 45 to hold the same in position. It will also be noted in Fig. 14 that the end pieces 38 and 39 have the aligned openings 46. Through these openings 46 is fitted the ring 47 of the head band 48. The clamp 40 has a hook shaped member 49 which engages the ring 47 when it is in place in the openings 46. The ring 47 is split at 50 so that it may be sprung open to enter the opening 46.

As previously stated, the head band 48 is attached on the center line 10 so that the head band 48 may take its proper place over the ears of the wearer. The clamp 40 provides a simple and efficient means for opening the rim 3 to insert or take out a lens and to lock the same in place in the rim, and the member 49 on the clamp 40 by its engagement with the ring 47 insures that these end members cannot be opened until the ring is removed from the endpiece members. It also holds the face contacting members 8 rigidly in the eye cup.

A tongue or plate member 61, as shown in Fig. 3 and Fig. 18 is used to hold the resilient member 6 in position when the endpieces 38 and 39 are being closed so that the resilient member will not be pinched between the endpieces and prevent or hinder their being closed. This tongue or plate member 61 also acts as a guide for aligning the endpieces and may be attached at one end to the endpiece 38 as shown at 62 to extend over or span the split or opening 63 and slidingly engage the endpiece 39 at the opposite end or may be in the form of a plate attached to the retaining ring 5 adjacent the split or opening 63.

To position the resilient face contact rings 7 in the eye cups 3 of the goggle there is provided a locating pin or lug 64 adapted to extend into an opening 65 in the face retaining ring 5 so that it may be accurately positioned in the eyecup 3 previous to the clamping of the endpiece extensions which hold the retaining ring 5 in position.

The flange 6 of the resilient rubber member is cut away in the vicinity of the openings 29 and 30 and the opening 34 of the rim to allow the passage of air for ventilation.

From the foregoing description it will be seen that I have provided simple and efficient means for carrying out all the objects of the invention, particularly to obtain a wide range of vision, improved facial contact, improved ventilation, improved connecting means for the eye cups, and improved means for inserting and removing the lenses. The means for insuring contact in the nasal canthus are particularly novel and efficient.

Having described my invention, I claim:

1. In an eye protector mounting, an eye cup having orifices on opposite sides thereof, bearing means adjacent one of the orifices, a pair of slidable sleeves in the bearing means having oppositely arranged tapered bores, the smaller cross sections being adjacent, and means to lock the sleeves in position with a fixed space between them, said space opening into the orifice in the eye cup.

2. In an eye protector mounting, an eye cup having orifices on opposite sides thereof, bearing means adjacent one of the orifices, a pair of movable tubular members in the bearing means, and means to lock the tubular members in position with a fixed space between them, said space opening into the orifice in the eye cup.

3. In an eye protector mounting, an eye cup having orifices on opposite sides thereof, and a hood member over one of the orifices having an oppositely tapered bore, the smaller cross section of which is intermediate its ends and overlies the orifice in the eye cup.

4. In an eye protector mounting, an eye cup having offset endpieces abutting one on the other, said endpieces having aligned openings, a pivoted lock member embracing the endpieces and having a securing portion aligned with the openings in the endpieces when the lock is closed, and a temple connection through the aligned openings and the securing portion of the lock adapted to hold the lock in locked position and to secure the temple to the eye cup.

5. In an eye protector mounting, an eye cup, a hollow sleeve on the eye cup, a bridge bar member extending into the sleeve, the end of the bridge bar being adjacent to the end of the sleeve opposite to the side on which the bridge bar member enters, and a soldering medium connecting the adjacent ends of the sleeve and bridge bar.

6. In an eye protector mounting, an eye cup having a resilient peripheral face engaging member, the cross sectional shape of which is approximately concavo-convex, having a portion increasing in thickness adjacent the nose of the wearer adapted to fit into the nasal canthus to close the opening between the nasal canthus and the interior of the eye cup.

7. In an eye protector mounting, an eye cup having an angled rim on the nose side thereof and a resilient peripheral face engaging member, the cross sectional shape of which is approximately concavo-convex having a projection increasing in thickness and extending over the edge of the angled rim adapted to fit into the nasal canthus to close the opening between the nasal canthus and the interior of the eye cup.

8. In an eye protector mounting, a lens rim having a pair of offset endpieces adapted to abut one on the other end a resilient face contacting member in the lens rim having a guide member thereon over which the endpieces may be slidably guided into alignment.

9. In an eye protector mounting, an eyecup having offset endpieces abutting one on the other and having perforations therein, means movable on said endpieces adapted to traverse one of said perforations to secure the offset ends together, a head engaging member, and means on said head engaging member adapted to be positioned within said traversed perforation to hold the movable means against retraction over said perforation.

10. In an eye protector mounting, an eyecup having offset endpieces abutting one on the other, one of said endpieces having an opening therein, a movable lock member embracing the endpieces and having a portion adapted to traverse the opening when the offset ends are being secured together, a head engaging member and means on said head engaging member adapted to be positioned in said traversed opening to hold the lock member against retraction over said opening.

11. In an eye protector mounting, an eyecup having offset endpieces abutting one on the other, one of said endpieces having an opening therein, interengaging means movable on one of said endpiece members without separation therefrom and having a portion adapted to embrace the endpiece members to secure them together, a head band and a hook member on said head band adapted to be positioned within the opening in the endpiece member to secure the movable means against movement when in embracing position on said endpiece members.

12. In a device of the character described, an outer eyecup member having separated ends, an inner eyecup member within the outer eyecup member, a face contacting member secured to one of the eyecup members and guide means over which the ends of the outer eyecup member may be guided into alignment.

13. In a device of the character described, an outer eyecup frame having offset terminal endpieces abutting each other and having its inner edge shaped substantially to a face contacting contour, an inner eyecup frame within the first frame and having its inner edge shaped to substantially a face contacting contour, a resilient face contacting member having a face contacting portion and an attaching portion offset from said face contacting portion, said attaching portion being shaped to the line of the inner frame and held in place thereby, interengaging male and female connections on said eyecup frames slidable into and out of engagement with each other when the offset endpieces are separated and means for holding the abutting endpieces together.

14. In a device of the character described, an outer eyecup frame having offset terminal endpieces abutting each other and having its inner edge shaped substantially to a face contacting contour, an inner eyecup frame within the first frame and having its inner edge shaped to substantially a face contacting contour, a resilient face contacting member having a face contacting portion and an attaching portion offset from said face contacting portion, said attaching portion being shaped to the line of the inner frame and held in place thereby, means slidably engaging each other on said eyecups slidable into and out of engagement with each other when the endpieces are separated and means for holding the abutting endpieces together.

NELSON M. BAKER.